(12) United States Patent
Gethmann et al.

(10) Patent No.: US 8,544,820 B2
(45) Date of Patent: Oct. 1, 2013

(54) BIASING APPARATUS FOR USE WITH ACTUATORS

(75) Inventors: Douglas P. Gethmann, Gladbrook, IA (US); David George Halm, Haverhill, IA (US); David Anthony Arnold, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 588 days.

(21) Appl. No.: 12/495,197

(22) Filed: Jun. 30, 2009

(65) Prior Publication Data
US 2010/0327207 A1    Dec. 30, 2010

(51) Int. Cl.
*F01L 3/10*    (2006.01)

(52) U.S. Cl.
USPC .......................................... 251/337; 251/284

(58) Field of Classification Search
USPC ................................. 251/284, 337
See application file for complete search history.

(56) References Cited

U.S. PATENT DOCUMENTS

| | | | |
|---|---|---|---|
| 3,245,325 A * | 4/1966 | Giusti, Jr. et al. | 92/13.1 |
| 3,635,254 A * | 1/1972 | Mitchell | 138/45 |
| 3,981,479 A | 9/1976 | Foster et al. | |
| 4,350,081 A | 9/1982 | Fry et al. | |
| 4,378,932 A * | 4/1983 | Avery | 251/61.4 |
| 4,745,849 A | 5/1988 | Emilsson et al. | |
| 4,809,733 A | 3/1989 | Hawkins | |
| 5,141,022 A * | 8/1992 | Black | 137/495 |
| 5,463,986 A | 11/1995 | Hollis | |
| 6,536,738 B2 * | 3/2003 | Inoue et al. | 251/5 |
| 6,793,194 B1 | 9/2004 | Grinberg | |
| 7,255,321 B2 * | 8/2007 | Tomioka et al. | 251/5 |
| 7,744,062 B2 * | 6/2010 | Dalluge | 251/284 |
| 2007/0001134 A1 | 1/2007 | Lonnes | |

FOREIGN PATENT DOCUMENTS

| | | |
|---|---|---|
| DE | 4244080 A1 | 9/1993 |
| EP | 0798483 A1 | 10/1997 |
| WO | 86/04400 A1 | 7/1986 |

OTHER PUBLICATIONS

"Sleeve." Merriam-Webster.com. 2011. http://www.merriam-webster.com (Jun. 4, 2012).*
Patent Cooperation Treaty, "International Search Report," issued by the International Searching Authority in connection with related PCT application No. PCT/US2010/033766, mailed Sep. 28, 2010 (4 pages).
Patent Cooperation Treaty, "Written Opinion of the International Searching Authority," issued by the International Searching Authority in connection with related PCT application No. PCT/US2010/033766, mailed Sep. 28, 2010 (4 pages).
Chinese State Intellectual Property Office, "First Office Action," issued in connection with Chinese Application No. 201080027885.4, mailed on Mar. 14, 2013, 17 pages.

* cited by examiner

*Primary Examiner* — John K Fristoe, Jr.
*Assistant Examiner* — R. K. Arundale
(74) *Attorney, Agent, or Firm* — Hanley, Flight and Zimmerman, LLC.

(57) ABSTRACT

Biasing apparatus for use with actuators are described. A biasing apparatus for use with a piston actuator includes a first sleeve at least partially surrounded by and movably coupled to a second sleeve. Additionally, the biasing apparatus includes a stop to limit an amount of movement of the first sleeve relative to the second sleeve and a biasing element positioned between first and second ends of the respective first and second sleeves to urge the first sleeve away from the second sleeve.

20 Claims, 10 Drawing Sheets

BIASING APPARATUS FOR USE WITH ACTUATORS

FIELD OF THE DISCLOSURE

This patent relates generally to biasing apparatus and, more specifically, to biasing apparatus for use with actuators.

BACKGROUND

Control valves (e.g., linear valves, rotary valves, etc.) are commonly used in process control systems to control the flow of process fluids. A control valve typically includes an actuator (e.g., a pneumatic actuator, hydraulic actuator, etc.) to operate the control valve. To provide these actuators with biasing functionality, a spring is commonly positioned in the actuator to bias a piston of the actuator and/or to return a fluid control member of the control valve to a fail safe position (e.g., an open position, a closed position) during, for example, a system failure. Although the spring provides the actuator with biasing functionality, assembling and/or disassembling the actuator may be somewhat difficult because of the force exerted by the spring on different components of the actuator.

SUMMARY

A biasing apparatus for use with a piston actuator includes a first sleeve at least partially surrounded by and movably coupled to a second sleeve. Additionally, the biasing apparatus includes a stop to limit an amount of movement of the first sleeve relative to the second sleeve and a biasing element positioned between first and second ends of the respective first and second sleeves to urge the first sleeve away from the second sleeve.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to biasing apparatus that decreases the complexity and/or the time required to assemble and/or disassemble actuators. Specifically, the examples described herein enable actuators to be assembled and/or disassembled without first having to compress and/or decompress a spring positioned in the actuator.

In some examples, the biasing apparatus includes a preloaded spring positioned between ends of opposing sleeves that are telescopically coupled together. The sleeves may include opposing flanges that engage and/or interlock to limit an amount of movement of the sleeves relative to each other. Additionally, the biasing apparatus may be provided with one or more travel stops to limit the amount of movement of the sleeves toward each other and/or to prevent the spring from becoming coil bound. While the example biasing apparatus described herein is depicted being utilized with actuators, the example biasing apparatus may be used in any other suitable application.

Figure 1:
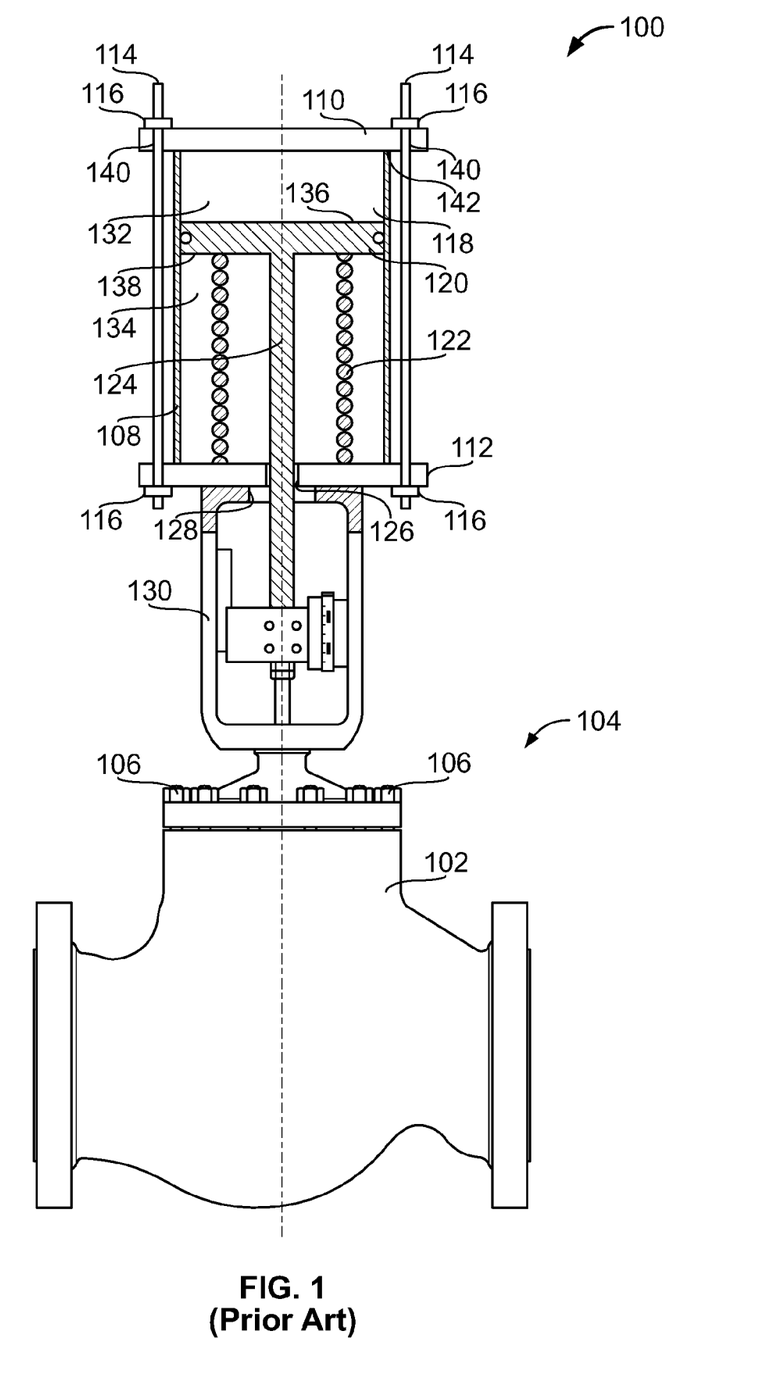
FIG. 1 depicts a known actuator and control valve.

FIG. 1 depicts a known actuator 100 coupled to a body 102 of a control valve 104 (e.g., a globe valve, a sliding stem valve) via a plurality of fasteners 106. The actuator 100 includes a cylinder or housing 108 coupled between a first plate 110 and a second plate 112 via a plurality of tie rods 114 and fasteners 116. The cylinder 108 defines a chamber 118 in which a piston 120, a spring 122 and a portion of an actuator stem or rod 124 are positioned. In single-acting and/or double-acting piston actuators, the spring 122 provides the actuator 100 with fail-safe biasing functionality to move a fluid control element (e.g., a plug) (not shown) of the control valve 104 via the piston 120 to a fail-safe position (e.g., an open position or a closed position) during, for example, a system failure. The actuator rod 124 is positioned through an aperture 126 defined by the second plate 112 and an aperture 128 defined by a yoke 130 of the actuator 100.

In practice, the actuator 100 may be coupled to the body 102 to control the flow of fluid through the control valve 104. In particular, the actuator 100 may be used to control the position of the fluid control element operatively coupled to the actuator rod 124 within the body 102 of the control valve 104. In operation, to move the fluid control element within the control valve 104, a pressure difference is provided across a first chamber portion 132 and a second chamber portion 134. For example, to move the fluid control element away from an orifice (not shown) to enable fluid flow through the control valve 104, the piston 120 may be moved toward the first plate 110 by exhausting fluid (e.g., air, hydraulic fluid) through, for example, a port (not shown) to decrease the pressure in the first chamber portion 132. As the pressure in the first chamber portion 132 decreases, the force exerted against a first surface 136 of the piston 120 also decreases (e.g., force=pressure*area) until, for example, a force exerted against a second surface 138 of the piston 120 via the spring 122 overcomes the force exerted against the first surface 136 via the pressure in the first chamber portion 132. As a result, the piston 120 and the actuator rod 124 move toward the first plate 110 to move the fluid control element within the control valve 104.

Alternatively, to move the fluid control element toward the orifice to substantially stop the flow of fluid through the control valve 104, the piston 120 may be moved toward the second plate 112 by pumping fluid through the port to increase the pressure in the first chamber portion 132 to overcome the force exerted on the second surface 138 via the spring 122. As a result, the piston 120 and the actuator rod 124 move toward the second plate 112 to move the fluid control element within the control valve 104.

To assemble the actuator 100, the spring 122 is positioned in the chamber 118 adjacent the second plate 112 and the piston 120 and the actuator rod 124 are then guided through the spring 122 and the apertures 126 and 128. However, because the spring 122 is typically fully decompressed when the spring 122 is positioned in the chamber 118, coupling the first plate 110 to the actuator 100 may be difficult. In some examples, to enable the first plate 110 to be coupled to the actuator 100, the tie rods 114 may be relatively long to enable apertures 140 of the first plate 110 to be aligned with the tie rods 114 when the spring 122 is decompressed and/or partially extending from the cylinder 108 along with the piston 120. As the fasteners 116 are tightened on the tie rods 114, the first plate 110 moves toward the cylinder 108 and compresses the spring 122 until, for example, the first plate 110 engages an end 142 of the cylinder 108. Alternatively, to disassemble the actuator 100, a person may loosen the fasteners 116 from the tie rods 114 to enable the spring 122 to substantially decompress before the first plate 110 may be removed from the actuator 100. In other examples, the plurality of tie rods 114 may be of varying lengths to enable the spring 122 to substantially decompress prior to all of the fasteners 116 being removed from the tie rods 114.

Figure 2:
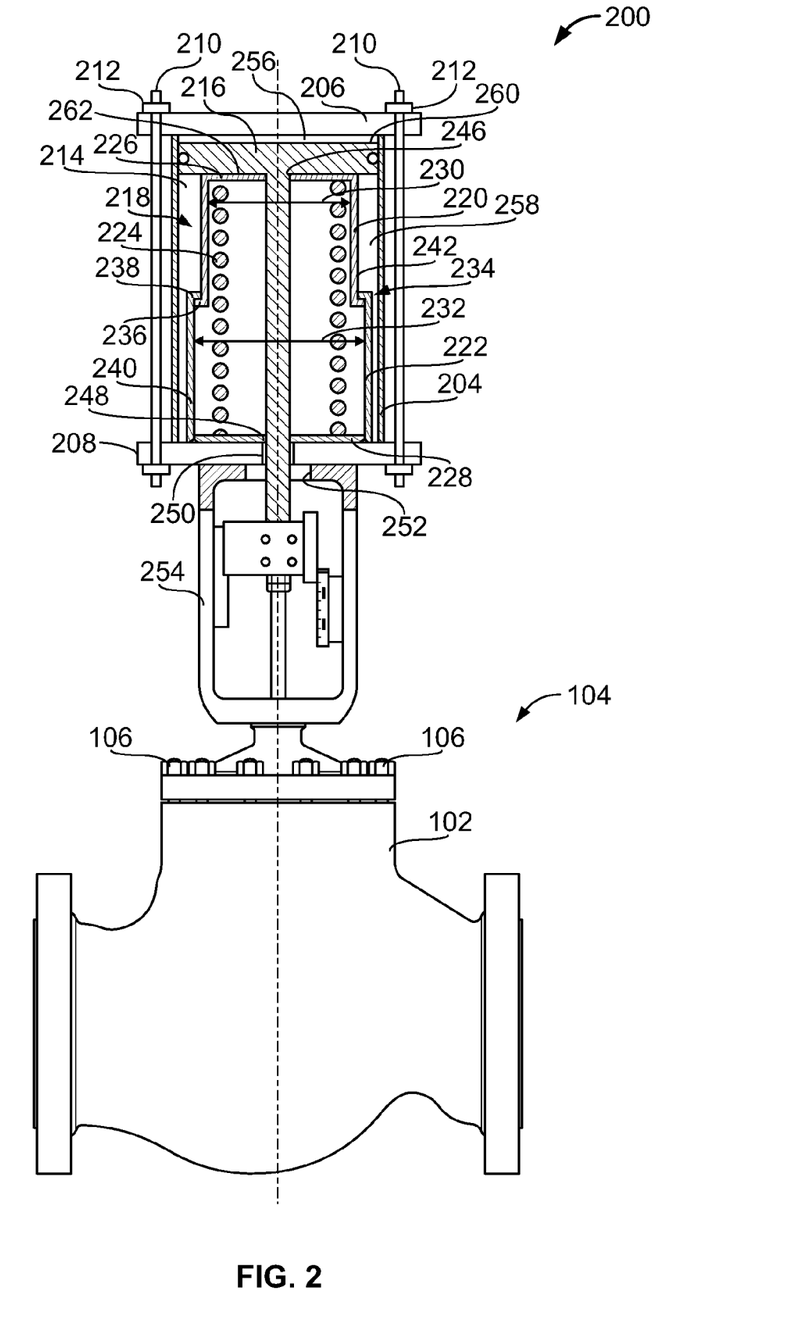
FIG. 2 depicts a control valve and an actuator that includes an example biasing apparatus.

FIG. 2 depicts an example actuator or valve actuator 200 (e.g., a piston actuator, a single-acting piston actuator, a double-acting piston actuator) coupled to the body 102 of the control valve 104 via the plurality of fasteners 106. The actuator 200 includes a cylinder 204 coupled between a first plate 206 and a second plate 208 via a plurality of tie rods 210 and fasteners 212. In contrast to the known actuator 100 described above, the cylinder 204 defines a chamber 214 in which a piston 216 and an example biasing apparatus 218 are positioned. The biasing apparatus 218 may be manufactured and/or produced to be a self-contained unit or module that is disposed in the chamber 214 to provide a double-acting piston actuator with fail-safe biasing functionality and decrease the complexity of assembling and/or disassembling the example actuator. Additionally, the biasing apparatus 218 may be utilized with a single-acting piston actuator to bias a piston operatively coupled to the fluid control element. In practice, the biasing apparatus 218 may provide the single-acting piston actuator with fail-safe biasing functionality as well as decrease the complexity of assembling and/or disassembling the example actuator.

Figure 3:
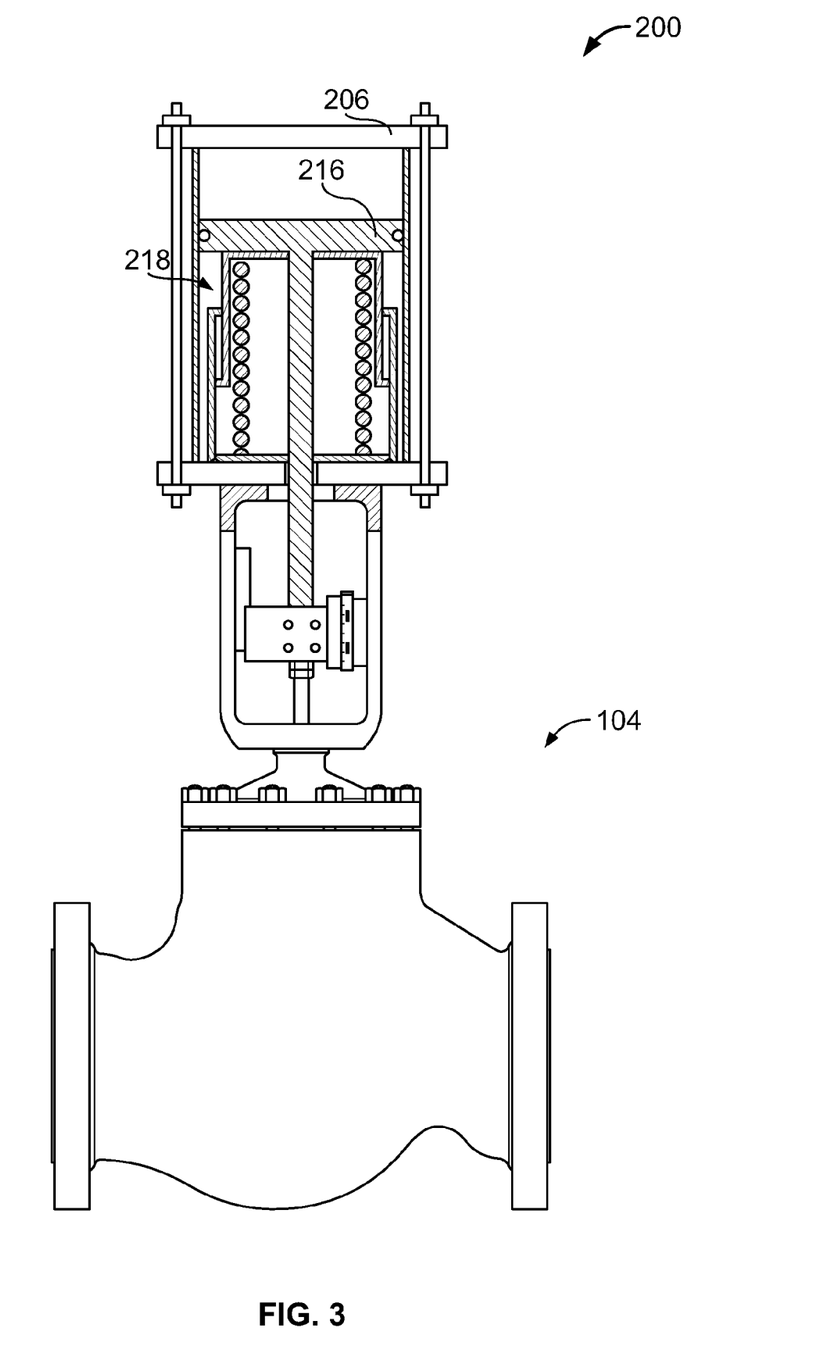
FIG. 3 depicts the control valve and the actuator of FIG. 2 in a different position.

As depicted in FIG. 2, the biasing apparatus 218 is extended to position the fluid control element via the piston 216 in, for example, an open position and/or a fail-safe position (e.g., an open position or a closed position). In contrast, FIG. 3 depicts the biasing apparatus 218 at least partially compressed and the piston 216 at a distance from the first plate 206 to substantially prevent fluid flow through the control valve 104.

The example biasing apparatus 218 includes a first sleeve 220, a second sleeve 222 and a biasing element 224 (e.g., a spring) positioned between first and second ends 226 and 228 of the respective sleeves 220 and 222. The biasing element 224 urges the first sleeve 220 away from the second sleeve 222 to position, for example, a fluid control member of the control valve 104 in the open position. The first sleeve 220 has a diameter 230 that is relatively smaller than a diameter 232 of the second sleeve 222 such that the second sleeve 222 at least partially surrounds the first sleeve 220. While the first end 226 is positioned adjacent the piston 216 in the example depicted in FIG. 2, alternatively, the second end 228 may be positioned adjacent the piston 216.

To limit an amount of movement of the first sleeve 220 relative to the second sleeve 222 and/or movably couple the sleeves 220 and 222 together, a stop 234 is provided between the sleeves 220 and 222. In this example, the stop 234 includes first and second opposing flanges 236 and 238 that engage and/or interlock to limit the movement of and/or movably couple the sleeves 220 and 222 together. The first flange 236 extends toward and/or is positioned adjacent to an interior surface 240 of the second sleeve 222 and the second flange 238 extends toward and/or is positioned adjacent to an exterior surface 242 of the first sleeve 220.

To assemble the actuator 200, the biasing apparatus 218 is positioned in the chamber 214 such that the second end 228 is adjacent the second plate 208. An actuator stem or rod 244 coupled to the piston 216 is then guided through coaxially aligned apertures 246 and 248 defined by the ends 226 and 228 and apertures 250 and 252 defined by the second plate 208 and a yoke 254, respectively. In contrast to the actuator 100 described above in which the spring 122 (FIG. 1) is fully decompressed when the spring 122 (FIG. 1) is initially positioned in the chamber 118 (FIG. 1), the biasing element 224 is compressed (e.g., preloaded) and contained within the biasing apparatus 218. As such, once the biasing apparatus 218, the actuator rod 244 and the piston 216 are positioned within the chamber 214, the first plate 206 may be coupled to the actuator 200 without any additional measures and/or precautions being taken. To disassemble the actuator 200, the fasteners 212 may be loosened and the first plate 206 may be removed without having to first decompress the biasing element 224 as discussed above.

In operation, to move the fluid control element within the control valve 104, a pressure difference is provided across a first chamber portion 256 and a second chamber portion 258. Specifically, to move the fluid control element toward the orifice, fluid is pumped through a port (not shown) such that a force exerted on a first surface 260 of the piston 216 overcomes a force exerted against a second surface 262 via the biasing element 224 of the biasing apparatus 218. Alternatively, to move the fluid control element away from the orifice, fluid is exhausted through the port until, for example, the force exerted on the second surface 262 via the biasing apparatus 218 overcomes the force exerted on the first surface 260 via the pressure in the first chamber portion 256.

Figure 4:
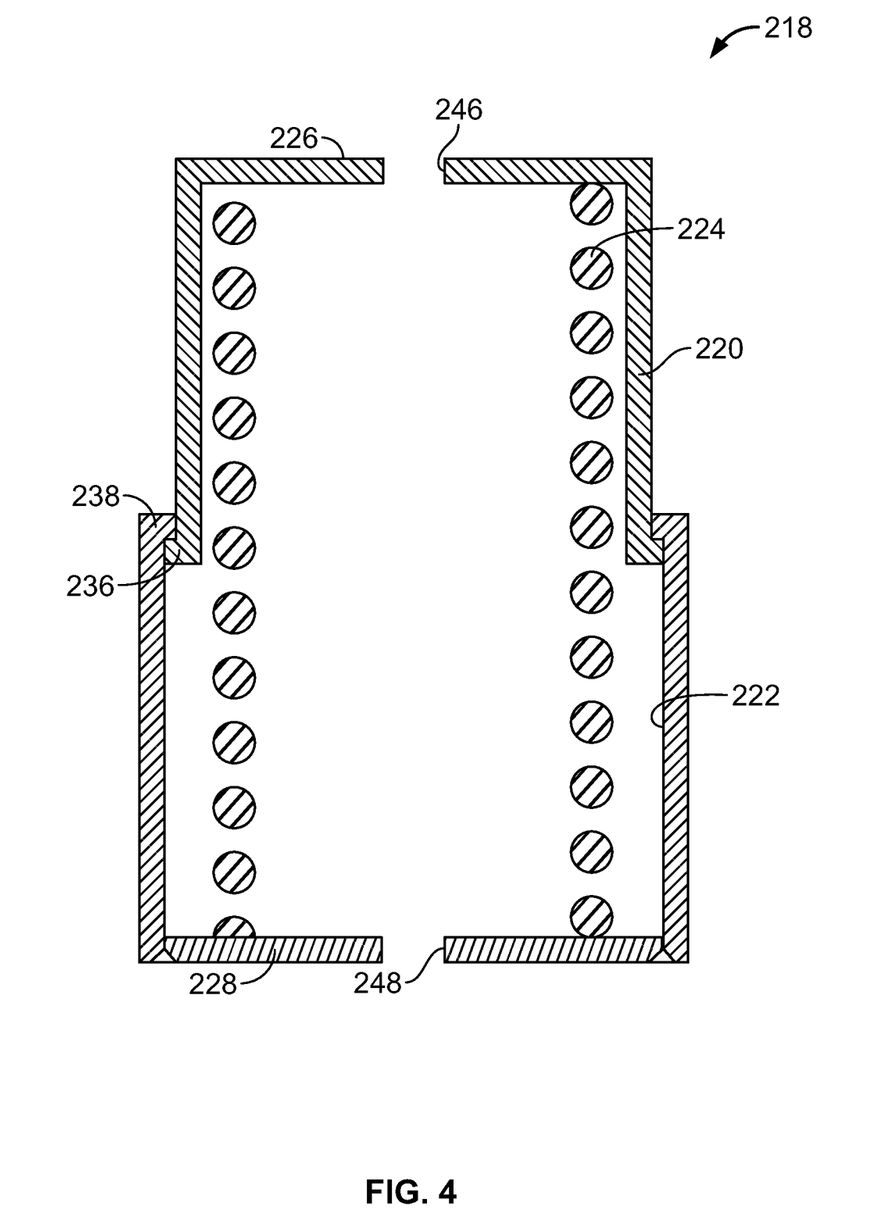
FIG. 4 depicts an enlarged view of the example biasing apparatus of FIG. 2.

FIG. 4 depicts an enlarged view of the example biasing apparatus 218. The biasing apparatus 218 may be adapted for use with any suitable actuator having any stroke length.

Figure 5:
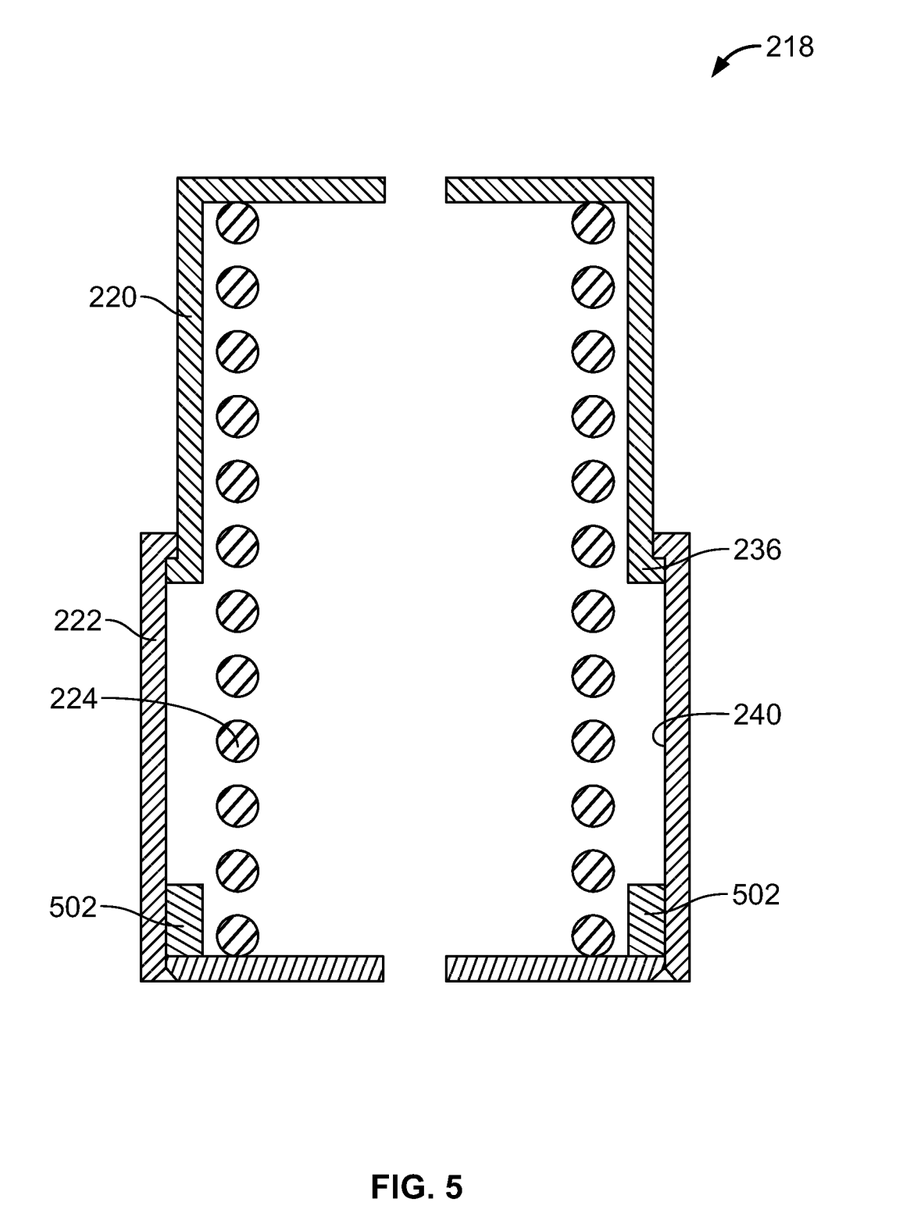
FIG. 5 depicts the example biasing apparatus of FIG. 2 including example stops.

FIG. 5 depicts the biasing apparatus 218 including second stops 502 (e.g., travel stops) coupled to the interior surface 240 of the second sleeve 222. The second stops 502 may be engaged by the first flange 236 of the first sleeve 220 to limit the amount of movement of the first sleeve 220 toward the second sleeve 222 and/or to prevent the biasing element 224 from becoming coil bound. In operation, as the force exerted on the first surface 260 of the piston 216 overcomes the force exerted on the second surface 262 via the biasing element 224, the biasing apparatus 218 may compress and the first flange 236 may engage the second stops 502 to limit the amount of movement of the first sleeve 220 toward the second sleeve 222. Such an approach of providing the biasing apparatus 218 with the second stops 502 enables the travel of the fluid control element to be tailored to the particular application regardless of the allowable cylinder stroke length.

Figure 6:
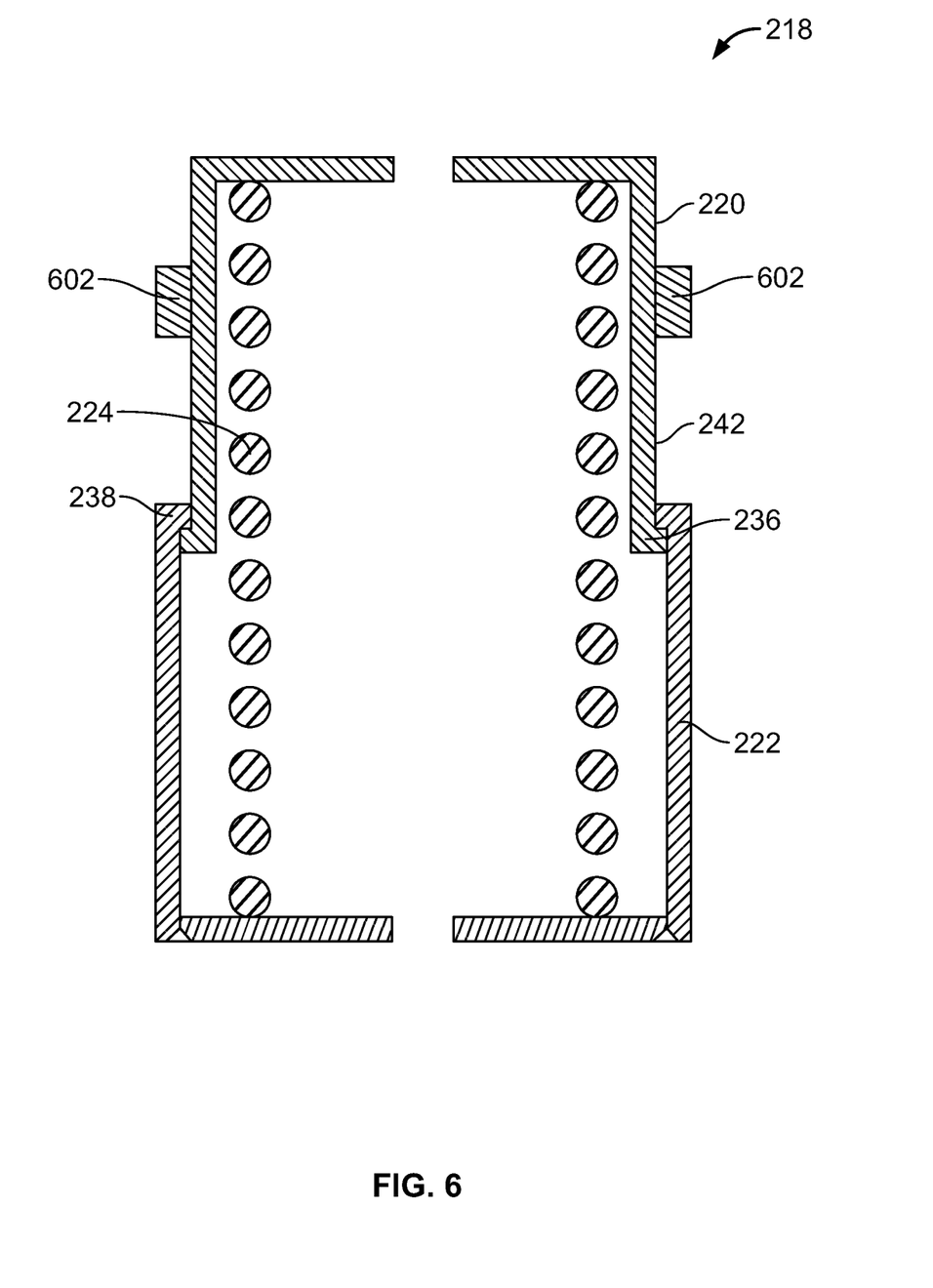
FIG. 6 depicts the example biasing apparatus of FIG. 2 including the example stops in an alternative position.

FIG. 6 depicts the biasing apparatus 218 including second stops 602 coupled to the exterior surface 242. The second stops 602 are substantially similar to the example second stops 502 of FIG. 5. However, the example second stops 602 may be engaged by the second flange 238 of the second sleeve 222 instead of the first flange 236 of the first sleeve 220.

Figure 7:
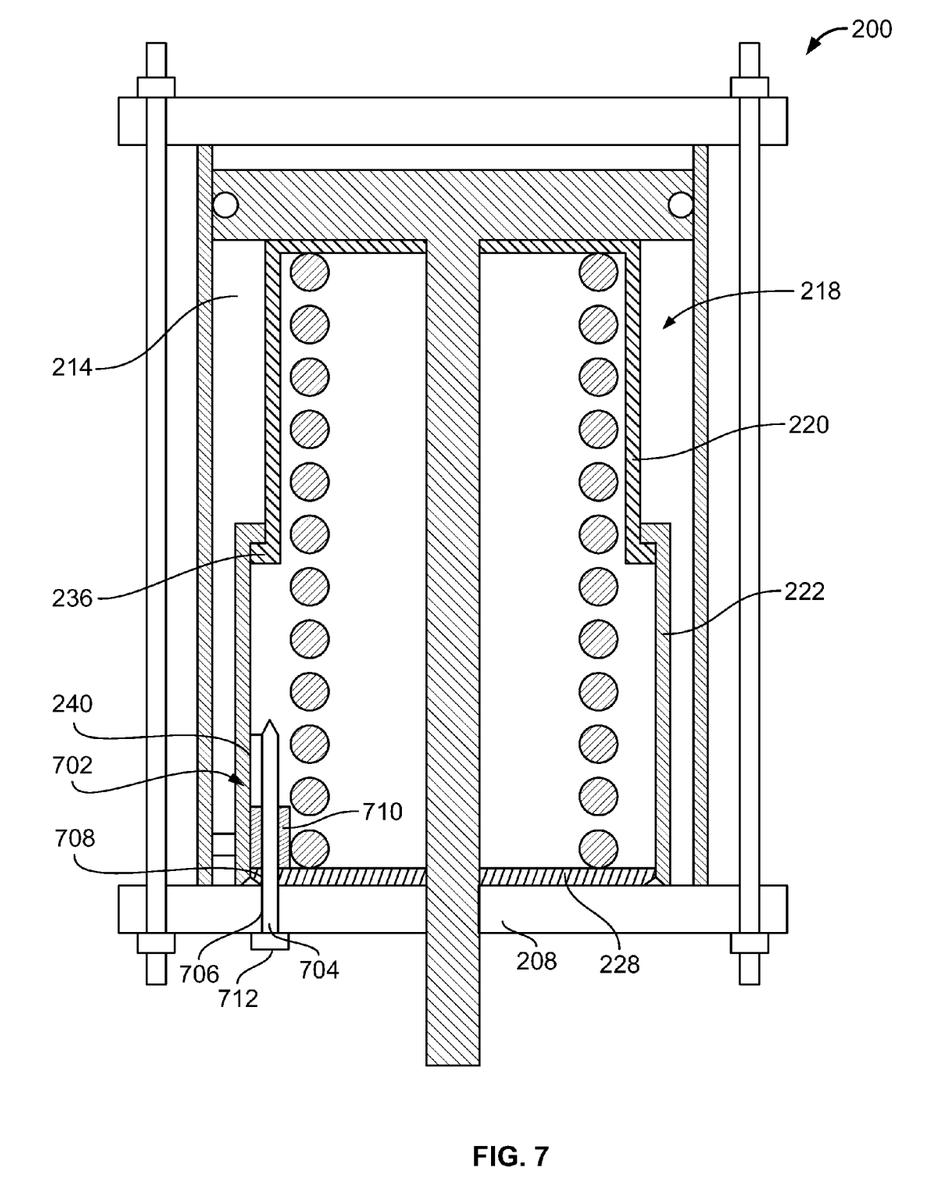
FIG. 7 depicts a portion of the actuator of FIG. 2 that includes the example biasing apparatus with an example externally adjustable stop.

FIG. 7 depicts a portion of the actuator 200 and the biasing apparatus 218 positioned within the chamber 214. In contrast to the examples described above, the biasing apparatus 218 includes an externally adjustable stop 702 (e.g., a field adjustable stop) positioned adjacent the second end 228 and the interior surface 240 of the second sleeve 222. The externally adjustable stop 702 includes a shaft 704 (e.g., a screw) that extends through apertures 706 and 708 of the second plate 208 and the second end 228. Additionally, the externally adjustable stop 702 may include a stop or ring 710 that at least partially surrounds the shaft 704 and may be engaged by the first flange 236 to limit the amount of movement of the first sleeve 220 relative to the second sleeve 222. To adjust the point at which the first flange 236 engages the stop 710 and/or the shaft 704, a person may rotate the shaft 704 via an end 712 to adjust the position of the externally adjustable stop 702 relative to the first flange 236. While the externally adjustable stop 702 of FIG. 7 includes the stop 710, in other examples, the externally adjustable stop 702 may not include the stop 710. In such examples, the first flange 236 may engage the shaft 704 to limit the amount of movement of the sleeves 220 and 222 relative to each other.

Figure 8:
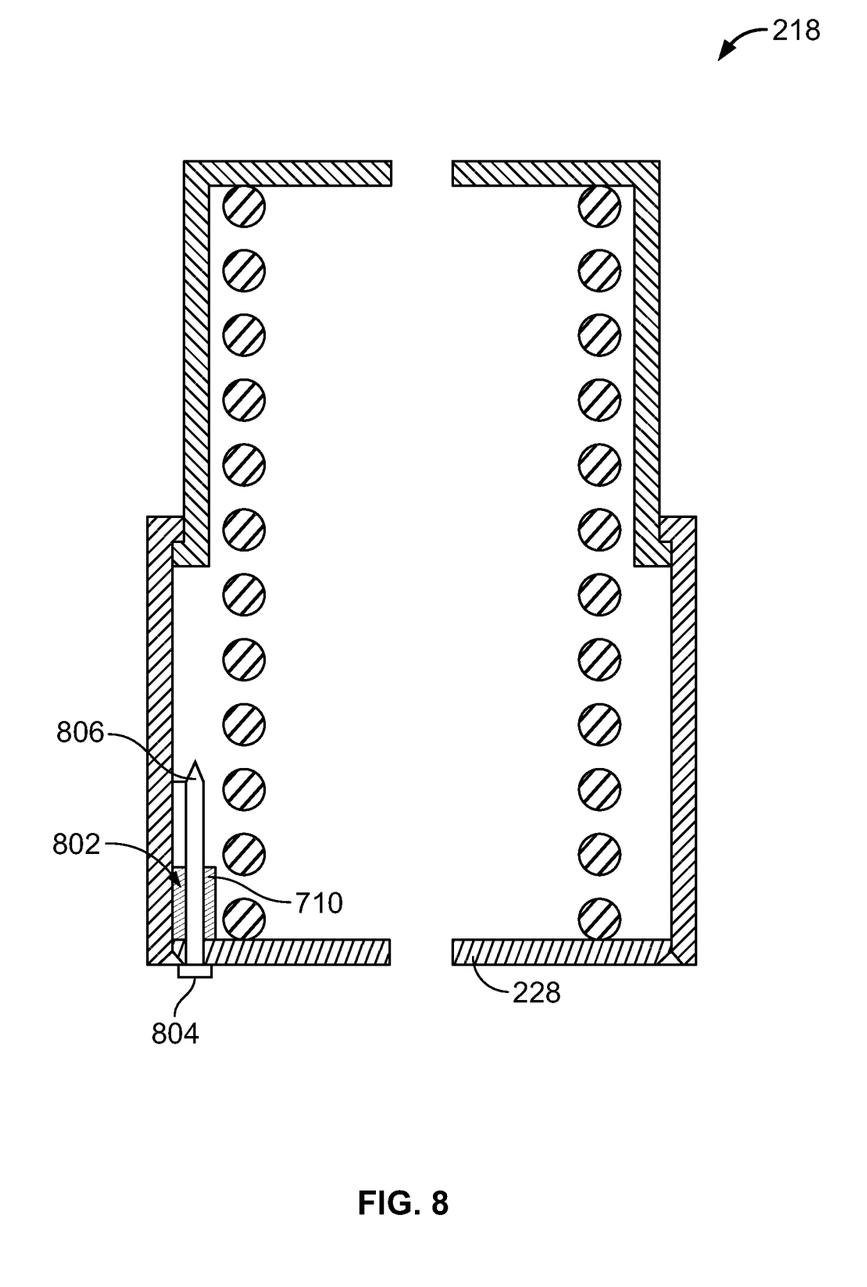
FIG. 8 depicts the example biasing apparatus of FIG. 2 with an alternative example externally adjustable stop.

FIG. 8 depicts the biasing apparatus 218 including an externally adjustable stop 802 that is substantially similar to the externally adjustable stop 702 of FIG. 7. However, an end 804 of a shaft 806 of the externally adjustable stop 802 of FIG. 8 is positioned adjacent the second end 228 instead of adjacent the second plate 208 (FIG. 2).

Figure 9:
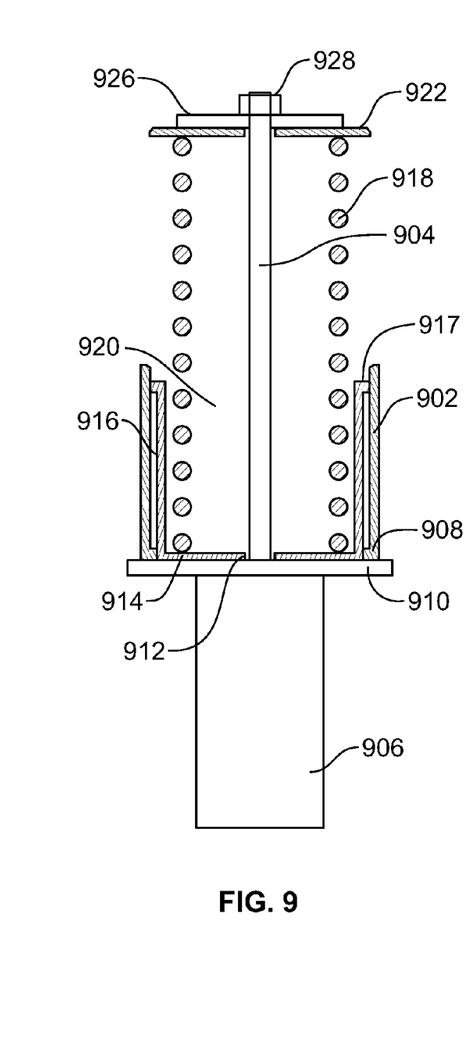
FIGS. 9-11 depict a process of producing an example biasing apparatus.
Figure 10:
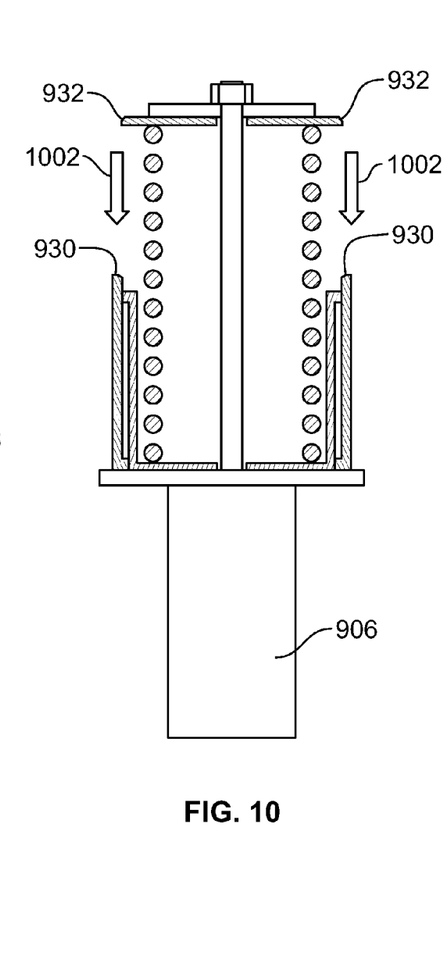
Figure 11:
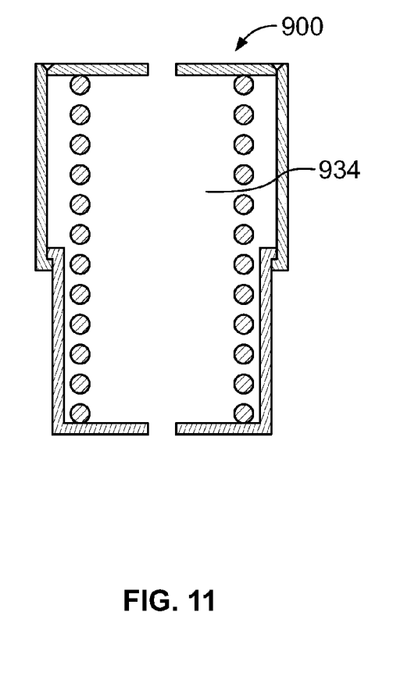

FIGS. 9-11 depict a process of manufacturing and/or producing an example biasing apparatus 900 (FIG. 11). A second sleeve 902 may be positioned on a shaft 904 extending from an assembly 906 (e.g., an assembly cylinder) such that a second flange 908 of the second sleeve 902 is positioned adjacent a plate 910 of the assembly 906. An aperture 912 of a first end 914 of a first sleeve 916 may then be positioned around the shaft 904 such that the first end 914 is positioned adjacent the plate 910 and a first flange 917 of the first sleeve 916 is positioned opposite the second flange 908 of the second sleeve 902. Next, a biasing element 918 may be positioned around the shaft 904 and partially within a chamber 920 defined by the first sleeve 916. A second end 922 may then be positioned on the shaft 904 such that the biasing element 918 is positioned between the ends 914 and 922. Another plate 926 may then be positioned on the shaft 904 and a fastener 928 may be threaded onto the shaft 904 to secure the sleeves 902 and 916, the second end 922 and the biasing element 918 relative to each other.

As depicted in FIG. 10, the assembly 906 may then move the other plate 926 toward the plate 910 in a direction generally represented by arrows 1002 by decreasing a length of the shaft 904 and compressing the biasing element 918 in a controlled manner. After the biasing element 918 is compressed a predetermined amount, a person may grasp and move the second sleeve 902 toward the second end 922 such that an end 930 of the second sleeve 902 engages a portion 932 of the second end 922. The person may then couple the second sleeve 902 to the second end 922 by any suitable method such as, for example, welding, adhesive bonding, etc.

Once the second sleeve 902 is coupled to the second end 922, the biasing element 918 may be preloaded and completely contained within a chamber 934 defined by the sleeves 902 and 916. Additionally, once the second sleeve 902 is coupled to the second end 922, the biasing apparatus 900 may not be disassembled and is substantially tamper proof. The fastener 928 and the biasing apparatus 900 may then be removed from the shaft 904. At this point, the biasing apparatus 900 is ready to be positioned in, for example, the chamber 214 (FIG. 2) of the cylinder 204 (FIG. 2).

Figure 12:
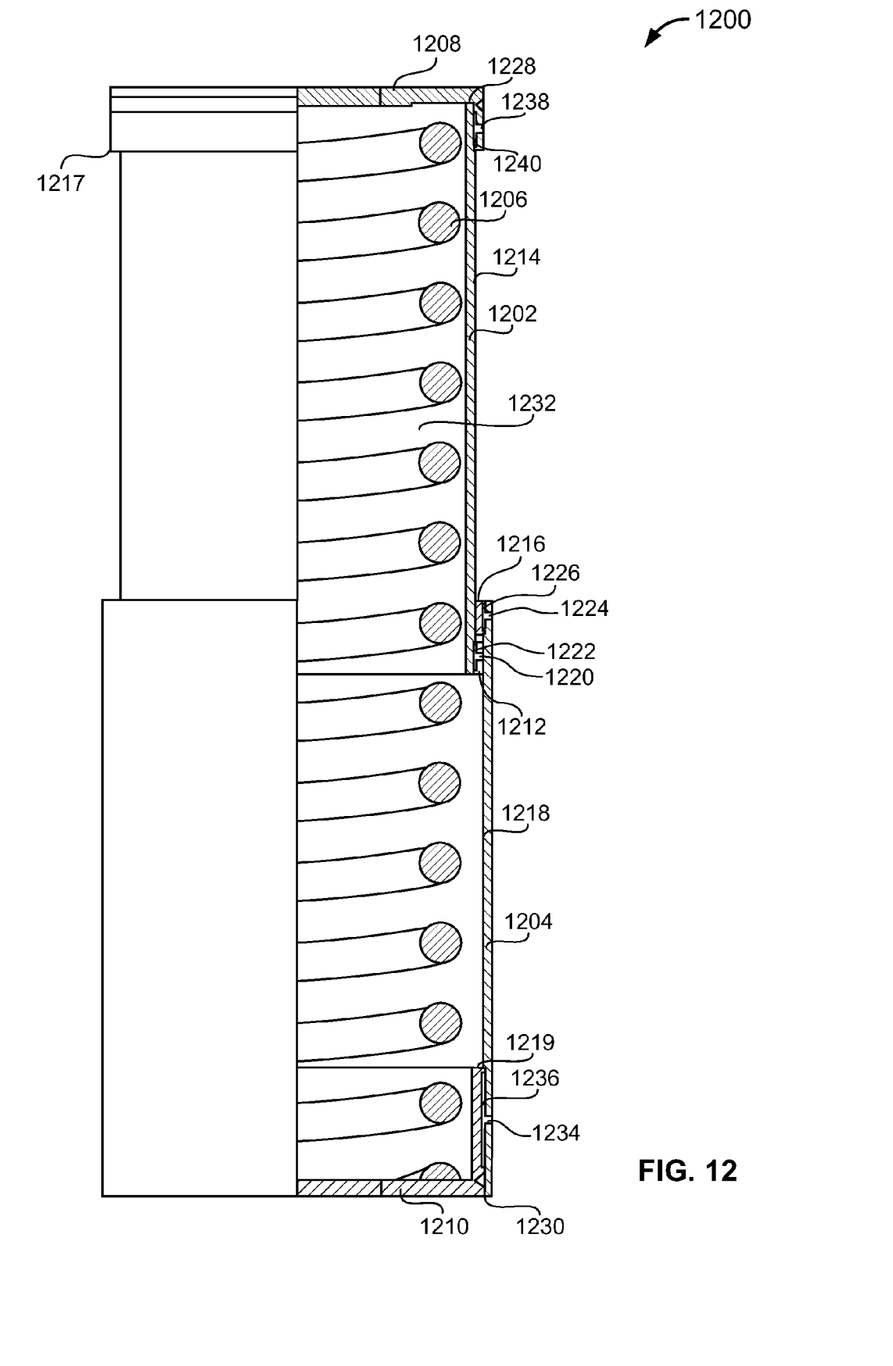
FIG. 12 depicts an alternative biasing apparatus.

FIG. 12 depicts an alternative biasing apparatus 1200 that includes a first sleeve 1202, a second sleeve 1204 and a biasing element 1206 (e.g., a spring) positioned between first and second end caps 1208 and 1210 of the respective sleeves 1202 and 1204. In some examples, the sleeves 1202 and 1204 may be made of a composite material and the end caps 1208 and 1210 may be made of a metal material.

To limit an amount of movement of the first sleeve 1202 relative to the second sleeve 1204, the first sleeve 1202 includes a first ring 1212 coupled to an exterior surface 1214 and the second sleeve 1204 includes a second ring 1216 coupled to an interior surface 1218. Additionally, in some examples, to limit the amount of movement of the first sleeve 1202 relative to the second sleeve 1204, the first end cap 1208 may at least partially surround the exterior surface 1214 of the first sleeve 1202 and be sized to enable the second ring 1216 to engage a portion 1217 of the first end cap 1208 as the biasing apparatus 1200 is compressed. Additionally or alternatively, in some examples, to limit the amount of movement of the first sleeve 1202 relative to the second sleeve 1204, the second end cap 1210 may be surrounded by the interior surface 1218 of the second sleeve 1204 and sized to enable the first ring 1212 to engage a portion 1219 of the second end cap 1210 as the biasing apparatus 1200 is compressed. The rings 1212 and/or 1214 may be made of any suitable material such as, for example, a metal material.

To movably couple the first sleeve 1202 to the second sleeve 1204, the first ring 1212 may be coupled to the exterior surface 1214 by positioning the first ring 1212 adjacent the exterior surface 1214 and injecting an adhesive through a port 1220 and into a recess 1222 defined by, for example, the first ring 1212. Similarly, the second ring 1216 may be coupled to the interior surface 1218 by positioning the second ring 1216 adjacent the interior surface 1218 and injecting an adhesive through a port 1224 and into a recess 1226 defined by, for example, the second ring 1216. An end 1228 of the first sleeve 1202 may then be guided through an opening 1230 of the second sleeve 1204.

To couple the second end cap 1210 to the second sleeve 1204, the second end cap 1210 may be at least partially inserted into a chamber 1232 defined by the sleeves 1202 and 1204 and then adhesive may be injected through a port 1234 and into a recess 1236. The biasing element 1206 may then be positioned in the chamber 1232 and the first end cap 1208 may be at least partially positioned about the exterior surface 1214 of the first sleeve 1202 to secure the biasing element 1206 within the chamber 1232. As discussed above, to couple the first end cap 1208 to the first sleeve 1202, adhesive may be injected through a port 1238 and into a recess 1240.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A piston actuator, comprising:
   a housing comprising a chamber;
   a piston to slidably engage a surface of the chamber; and
   a biasing apparatus, comprising:
   a first sleeve at least partially surrounded by and movably coupled to a second sleeve, the first and second sleeves comprising a second chamber different than the first chamber;

a stop to limit an amount of movement of the first sleeve relative to the second sleeve; and a biasing element positioned within the second chamber between first and second ends of the respective first and second sleeves to urge the first sleeve away from the second sleeve, wherein the biasing apparatus is to be completely inserted into the chamber to urge the piston toward a fail-safe position, wherein a space is defined along an entire length of the biasing apparatus between the biasing apparatus and the housing.

2. The biasing apparatus as defined in claim 1, wherein at least one of the first and second ends is to be positioned adjacent the piston to urge the piston toward the fail-safe position.

3. The biasing apparatus as defined in claim 1, wherein the stop is positioned between the first sleeve and the second sleeve.

4. The biasing apparatus as defined in claim 1, wherein the stop comprises first and second opposing flanges of the respective first and second sleeves.

5. The biasing apparatus as defined in claim 4, wherein the first flange is adjacent an interior surface of the second sleeve and the second flange is adjacent an exterior surface of the first sleeve.

6. The biasing apparatus as defined in claim 1, further comprising a second stop to limit an amount of movement of the first sleeve toward the second sleeve.

7. The biasing apparatus as defined in claim 6, wherein the second stop is coupled to an interior surface of the second sleeve.

8. The biasing apparatus as defined in claim 6, wherein the second stop is coupled to an exterior surface of the first sleeve.

9. The biasing apparatus as defined in claim 6, wherein the second stop is externally adjustable.

10. The biasing apparatus as defined in claim 1, wherein the first and second ends define coaxially aligned apertures to receive a stem.

11. The biasing apparatus as defined in claim 1, wherein a diameter of the first sleeve is relatively smaller than a diameter of the second sleeve.

12. A valve actuator, comprising:

a housing defining a chamber;

a piston positioned in the chamber to be operatively coupled to a fluid control member of a fluid valve, the piston to slidably engage a surface of the chamber; and a self-contained module positioned in the chamber to bias the piston, a space defined along an entire length of the self-contained module between the self-contained module and the housing, the self-contained module, comprising:

a first sleeve at least partially surrounded by a second sleeve, the first and second sleeves comprising a second chamber;

a biasing element positioned within the second chamber between first and second ends of the respective first and second sleeves to urge the first sleeve away from the second sleeve; and means for limiting an amount of movement of the first sleeve relative to the second sleeve.

13. The valve actuator as defined in claim 12, wherein the means for limiting the amount of movement of the first sleeve relative to the second sleeve comprises a stop.

14. The valve actuator as defined in claim 13, wherein the stop comprises first and second opposing flanges of the respective first and second sleeves.

15. The valve actuator as defined in claim 12, further comprising means for limiting an amount of movement of the first sleeve toward the second sleeve.

16. The valve actuator as defined in claim 15, wherein the means for limiting the amount of movement of the first sleeve toward the second sleeve comprises a stop to be engaged by an end of the first sleeve or an end of the second sleeve.

17. The valve actuator as defined in claim 16, wherein the stop is coupled to an interior surface of the second sleeve.

18. The valve actuator as defined in claim 16, wherein the stop is coupled to an exterior surface of the first sleeve.

19. The valve actuator as defined in claim 12, wherein the first and second ends define coaxially aligned apertures to receive a stem of the piston actuator.

20. A biasing apparatus for use with a piston actuator, comprising:

a first sleeve slidably and telescopically coupled to a second sleeve, each of the first and second sleeves at least partially define and surround a chamber; and a biasing element positioned within the chamber between first and second ends of the respective first and second sleeves to urge the first sleeve away from the second sleeve, wherein the biasing apparatus is to be completely positioned in a piston actuator chamber to urge a piston toward a fail-safe position, wherein a space is to be defined along an entire length of the biasing apparatus between the biasing apparatus and the piston actuator.

* * * * *